(12) United States Patent
Trim et al.

(10) Patent No.: US 11,556,709 B2
(45) Date of Patent: Jan. 17, 2023

(54) TEXT AUTOCOMPLETE USING PUNCTUATION MARKS

(71) Applicant: INTERNATIONAL BUSINESS MACHINES CORPORATION, Armonk, NY (US)

(72) Inventors: Craig M. Trim, Ventura, CA (US); Shikhar Kwatra, Durham, NC (US); Indervir Singh Banipal, Austin, TX (US); Rodrigo Goulart Silva, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 16/878,464

(22) Filed: May 19, 2020

(65) Prior Publication Data

US 2021/0365632 A1    Nov. 25, 2021

(51) Int. Cl.
*G06F 40/284* (2020.01)
*G06F 40/253* (2020.01)
(Continued)

(52) U.S. Cl.
CPC ............ *G06F 40/284* (2020.01); *G06F 17/16* (2013.01); *G06F 40/205* (2020.01);
(Continued)

(58) Field of Classification Search
CPC ...... G06F 40/284; G06F 17/16; G06F 40/253; G06F 40/205; G06F 40/279;
(Continued)

(56) References Cited

U.S. PATENT DOCUMENTS 5,706,450 A    1/1998  Shaiman et al.
8,543,382 B2   9/2013  Khorsheed et al.
(Continued)

FOREIGN PATENT DOCUMENTS

CN    110413987 A   * 11/2019
KR    20080056407 A    6/2008

OTHER PUBLICATIONS

Vig, J., "Deconstructing BERT: Visualizing the Inner Workings of Attention, Analyzing the Design Space for Visualizing Neural Attention in Text Classification," 2nd Workshop on Visualization for AI Explainability, IEEE VIS., 2019, 19 pg.
(Continued)

*Primary Examiner* — Linda Wong
(74) *Attorney, Agent, or Firm* — Cuenot, Forsythe & Kim, LLC

(57) ABSTRACT

A dataset comprising text-based messages can be accessed. Tokens for words and punctuation marks contained in the text-based messages can be generated. Each token corresponds to one word or one punctuation mark. A vector representation for each of a plurality of the tokens can be generated using natural language processing. A sequence of tokens corresponding to the text-based message can be generated for each of a plurality of the text-based messages in the dataset. Ones of the tokens that represent punctuation marks can be identified. An artificial neural network can be trained to predict use of the punctuation marks in sentence structures. The training uses the generated sequence of tokens and the vector representations for the tokens, in the sequence of tokens, that represent the punctuation marks.

18 Claims, 6 Drawing Sheets

(51) Int. Cl.
| | |
|---|---|
| *G06N 3/08* | (2006.01) |
| *G06F 40/205* | (2020.01) |
| *G06N 20/00* | (2019.01) |
| *G06F 17/16* | (2006.01) |
| *G06N 3/04* | (2006.01) |

(52) U.S. Cl.
CPC ............. *G06F 40/253* (2020.01); *G06N 3/04* (2013.01); *G06N 3/08* (2013.01); *G06N 20/00* (2019.01)

(58) Field of Classification Search
CPC .......... G06F 40/274; G06N 3/04; G06N 3/08; G06N 3/0481; G06N 3/0445; G06N 3/0454
See application file for complete search history.

(56) References Cited

U.S. PATENT DOCUMENTS

| | | | |
|---|---|---|---|
| 8,812,302 | B2 | 8/2014 | Xiao et al. |
| 2005/0068322 | A1 | 3/2005 | Falcioni |
| 2006/0013555 | A1 | 1/2006 | Poslinski |
| 2007/0061753 | A1 | 3/2007 | Ng et al. |
| 2008/0131031 | A1 | 6/2008 | Scott |
| 2008/0189606 | A1 | 8/2008 | Rybak |
| 2014/0380169 | A1 | 12/2014 | Eldawy |
| 2015/0309984 | A1 | 10/2015 | Bradford et al. |
| 2018/0330729 | A1* | 11/2018 | Golipour .................. G10L 15/26 |
| 2021/0089936 | A1* | 3/2021 | Zhao ....................... G06N 3/006 |

OTHER PUBLICATIONS

Horev, R., "BERT Explained: State of the art language model for NLP," [online] Towards Data Science, Nov. 10, 2018, retrieved from the Internet: <https://towardsdatascience.com/bert-explained-state-of-the-artlanguage-model-for-nlp-f8b21a9b6270>, 14 pg.

Devlin, J. et al., "Open Sourcing BERT: State-of-the-Art Pre-training for Natural Language Processing," [online] Google AI Blog, Nov. 2, 2018, retrieved from the Internet: <https://ai.googleblog.com/2018/11/open-sourcing-bert-state-of-art-pre.html>, 4 pg.

Mittal, A., "Understanding RNN and LSTM," [online] Towards Data Science, Oct. 12, 2019, retrieved from the Internet: <https://towardsdatascience.com/understanding-rnn-and-lstm-f7cdf6dfc14e>, 10 pg.

Nigam, V., "Natural Language Processing: From Basics to using RNN and LSTM, A detailed introduction to all the concepts prevalent in the world of Natural Language Processing," [online] Towards Data Science, May 17, 2019, retrieved from the Internet: <https://towardsdatascience.com/natural-language-processing-from-basics-to-using-rnn-and-lstm-ef6779e4ae66>, 33 pg.

"Keyboard Layout Charts," [online] International Keyboard Layouts, [retrieved May 18, 2020] retrieved from the Internet: <http://kbd-intl.narod.ru/english/layouts>, 12 pg.

* cited by examiner

TEXT AUTOCOMPLETE USING PUNCTUATION MARKS

BACKGROUND

The present invention relates to data processing systems, and more specifically, to data processing systems that perform text autocomplete on text-based messages.

Traditionally, text autocomplete is a feature in which an application predicts the rest of a word a user is typing. For example, in graphical user interfaces, users typically can press the tab key to accept a suggested word or the down arrow key to accept one of several suggested words. The use of autocomplete speeds up human-computer interactions when it correctly predicts the word a user intends to enter after only a few characters have been typed into a text input field.

SUMMARY

A method includes accessing a dataset comprising text-based messages. The method also can include generating tokens for words and punctuation marks contained in the text-based messages, each token corresponding to one word or one punctuation mark. The method also can include generating, using a processor implementing natural language processing, a vector representation for each of a plurality of the tokens. The method also can include generating, for each of a plurality of the text-based messages in the dataset, a sequence of tokens corresponding to the text-based message and identifying ones of the tokens that represent punctuation marks. The method also can include training an artificial neural network to predict use of the punctuation marks in sentence structures, the training using the generated sequence of tokens and the vector representations for the tokens, in the sequence of tokens, that represent the punctuation marks.

A system includes a processor programmed to initiate executable operations. The executable operations include accessing a dataset comprising text-based messages. The executable operations also can include generating tokens for words and punctuation marks contained in the text-based messages, each token corresponding to one word or one punctuation mark. The executable operations also can include generating, using natural language processing, a vector representation for each of a plurality of the tokens. The executable operations also can include generating, for each of a plurality of the text-based messages in the dataset, a sequence of tokens corresponding to the text-based message and identifying ones of the tokens that represent punctuation marks. The executable operations also can include training an artificial neural network to predict use of the punctuation marks in sentence structures, the training using the generated sequence of tokens and the vector representations for the tokens, in the sequence of tokens, that represent the punctuation marks.

A computer program product includes a computer readable storage medium having program code stored thereon. The program code is executable by a data processing system to initiate operations. The operations include accessing a dataset comprising text-based messages. The operations also can include generating tokens for words and punctuation marks contained in the text-based messages, each token corresponding to one word or one punctuation mark. The operations also can include generating, using natural language processing, a vector representation for each of a plurality of the tokens. The operations also can include generating, for each of a plurality of the text-based messages in the dataset, a sequence of tokens corresponding to the text-based message and identifying ones of the tokens that represent punctuation marks. The operations also can include training an artificial neural network to predict use of the punctuation marks in sentence structures, the training using the generated sequence of tokens and the vector representations for the tokens, in the sequence of tokens, that represent the punctuation marks.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
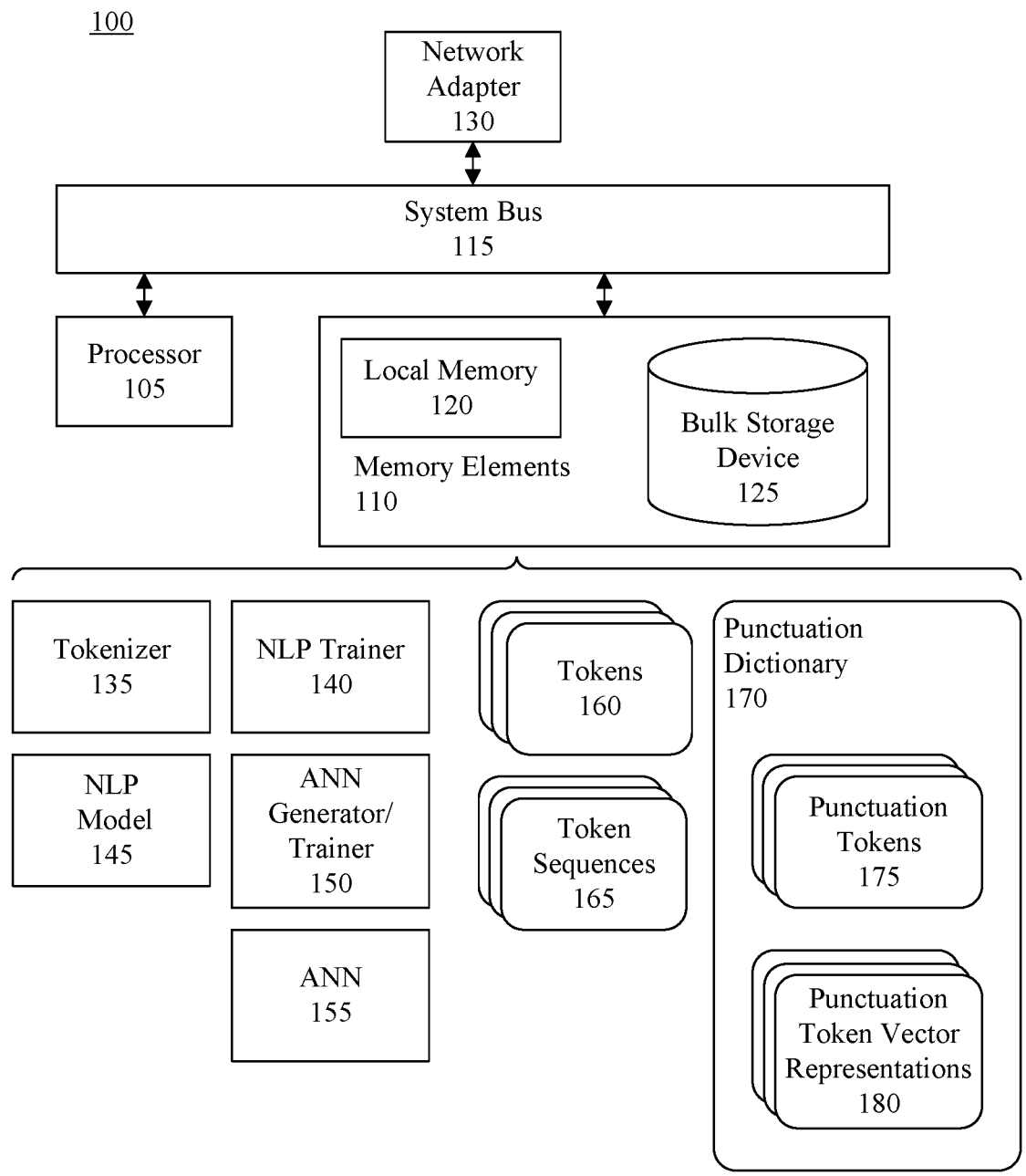
FIG. 1 is a block diagram illustrating example architecture for a data processing system.

The arrangements described herein are directed to computer technology, and provide an improvement to computer technology. Specifically, the present arrangements improve the performance of text autocomplete by automatically suggesting punctuation marks suitable for the tone and context of the text being generated. In this regard, a data processing system as described herein can use natural language processing (NLP) to generate data that is used to train an artificial neural network (ANN) to determine appropriate punctuation marks for various text-based messages. As users of client devices compose text-based messages, the ANN can interface with the client devices and predict appropriate punctuation marks for the text-based messages. The client devices can suggest those punctuation marks to the users for use in the text-based messages, or the client devices can automatically insert the punctuation marks where appropriate.

Several definitions that apply throughout this document now will be presented.

As defined herein, the term "text-based message" means message that includes text, and is communicated to at least one person via text messaging, communicated to at least one person via electronic mail (e-mail) or communicated to at least one person as a post in a social networking system.

As defined herein, the term "token" means a representation of a word or punctuation mark contained in a sentence.

As defined herein, the term "vector representation" means an element of a vector space that represents the meaning of a word or punctuation mark represented by a token and that is used to understand, through mathematical transformations, semantic similarity between words or use of punctuation marks.

As defined herein, the term "natural language processing" (NLP) means a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating example architecture for a data processing system 100. The data processing system 100 can include at least one processor 105 (e.g., a central processing unit) coupled to memory elements 110 through a system bus 115 or other suitable circuitry. As such, the data processing system 100 can store program code within the memory elements 110. The processor 105 can execute the program code accessed from the memory elements 110 via the system bus 115. It should be appreciated that the data processing system 100 can be implemented in the form of any system including a processor and memory that is capable of performing the functions and/or operations described within this specification. For example, the data processing system 100 can be implemented as a server, a plurality of communicatively linked servers, a workstation, a desktop computer, a mobile computer, and so on.

The memory elements 110 can include one or more physical memory devices such as, for example, local memory 120 and one or more bulk storage devices 125. Local memory 120 refers to random access memory (RAM) or other non-persistent memory device(s) generally used during actual execution of the program code. The bulk storage device(s) 125 can be implemented as a hard disk drive (HDD), solid state drive (SSD), or other persistent data storage device. The data processing system 100 also can include one or more cache memories (not shown) that provide temporary storage of at least some program code in order to reduce the number of times program code must be retrieved from the local memory 120 and/or bulk storage device 125 during execution.

Input/output (I/O) devices can be coupled to the data processing system 100 either directly or through intervening I/O controllers. For example, one or more network adapters 130 also can be coupled to data processing system 100 to enable the data processing system 100 to become coupled to other systems, computer systems, remote printers, and/or remote storage devices through intervening private or public networks. Modems, cable modems, transceivers, and Ethernet cards are examples of different types of network adapters 130 that can be used with the data processing system 100.

As pictured in FIG. 1, the memory elements 110 can store the components of the data processing system 100, such as a tokenizer 135, a natural language processing (NLP) trainer 140, a NLP model 145, and an artificial neural network (ANN) generator/trainer 150 and an artificial neural network (ANN) 155. The NLP model 145 can be, for example, a Bidirectional Encoder Representations from Transforms (BERT) model, which also uses an ANN architecture. The ANN 155 can be, for example, a Long Short-Term Memory (LSTM)/Recurrent Neural Network. Being implemented in the form of executable program code, these components 135-155 of the data processing system 100 can be executed by the data processing system 100 and, as such, can be considered part of the data processing system 100. Moreover, the tokenizer 135, NLP trainer 140, NLP model 145, ANN generator/trainer 150 and ANN 155 are functional data structures that impart functionality when employed as part of the data processing system 100.

The memory elements 110 also can store data generated by the components 135-155 of the data processing system 100, for example tokens 160 and token sequences 165. Moreover, the memory elements 110 can store a punctuation dictionary 170. Within the punctuation dictionary 170 the data processing system 100 can selectively store tokens 160 that are punctuation tokens 175 and store vector representations 180 of the punctuation tokens 175.

Figure 2:
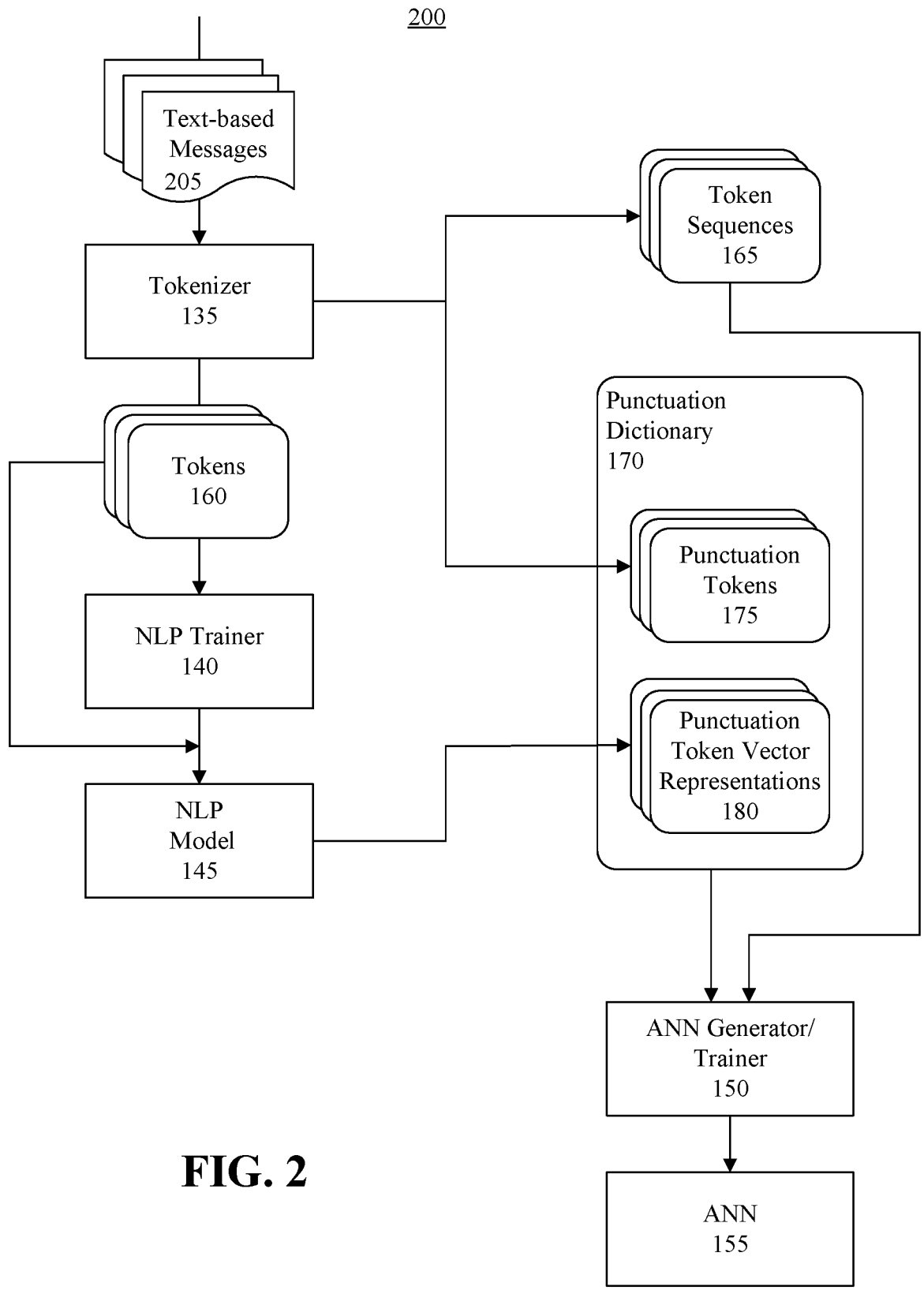
FIG. 2 is a flow diagram illustrating an example of creating a training dataset for training an artificial neural network.

FIG. 2 is a flow diagram 200 illustrating an example of creating a training dataset for training the ANN 155. The processes described in the flow diagram 200 can be performed by various components of 135-155 the data processing system 100, as will be described.

The tokenizer 135 can access a plurality of text-based messages 205. For example, the tokenizer 135 can access the text-based messages 205 from one or more other systems to which the data processing system 100 is communicatively linked, for example a text messaging server and/or an e-mail server. In another example, in addition to, or in lieu of, the text-based messages 205, the tokenizer 135 can access text data generated using speech recognition performed on spoken utterances. Further, the tokenizer 135 can access data indicating facial expressions of people while speaking the utterances and analyze that data to determine appropriate punctuation marks and their locations in the text data generated using the speech recognition. Such data can be generated using gesture recognition (e.g., facial gesture recognition) in combination with speech recognition. Hereinafter reference will be made to text-based messages 205, but it will be understood that the text data generated using speech recognition and data indicating facial expressions of people while speaking the utterances can be used in addition to, or in lieu of, the text-based messages 205.

The tokenizer 135 can parse the text-based messages 205 into tokens 160. Each token can be a single word or punctuation mark in a text-based message 205. In illustration, assume a text-based message 205 includes the sentence "Are you John Smith?" The Tokenizer 135 can generate the following tokens 160 for that sentence: "Are," "you," "John," "Smith" and "?." The tokenizer can store tokens 160 that are punctuations marks, e.g., the token "?," to the punctuation dictionary 170 as punctuation tokens 175.

Further, the tokenizer can store each token sequence 165 to the memory elements 110. For example, continuing with the previous example, the tokenizer 135 can store the sequence of tokens "Are," "you," "John," "Smith" and "?" as a token sequence 165. The token sequences 165 can include padded inputs. For example, the token sequence 165 for the previous example can be stored using the following format/syntax:

input: ['Are','you','John','Smith'] label: ['?']

The tokenizer 135 can pass the tokens 160 for each text-based message 205 to the NLP trainer 140 as a group of tokens, or the NLP trainer 140 can otherwise access groups of tokens 160 in a suitable manner. The NLP trainer 140 can use the group of tokens 160 for each text-based message 205 to train the NLP model 145 to generate a vector representation of each token. In illustration, continuing with the previous example, the NLP trainer 140 can use the group of tokens ['Are','you','John','Smith','?'] as training data to train the NLP model 145 to generate vector representations 180 for the tokens 160. In this regard, the NLP trainer 140 can use the groups of tokens 160 parsed from each of the text-based messages 205 to train the NLP model 145 to generate vector representations for the tokens 160.

As noted, in an arrangement the NLP model 145 can be a BERT model, which also uses an ANN architecture. A BERT model is a non-directional model in that it reads an entire sequence of tokens at once, rather than sequentially (left-to-right or right-to-left). This characteristic allows the model to learn the context of a word or symbol (e.g., punctuation mark) based on surrounding words/symbols. In an arrangement, the NLP trainer 140 can include, or otherwise access, cloud-based tensor processing units (TPUs) to train the BERT model using machine learning. The TPUs can be, for instance, application specific integrated circuits (ASICs), though the present arrangements are not limited in this regard.

Figure 3:
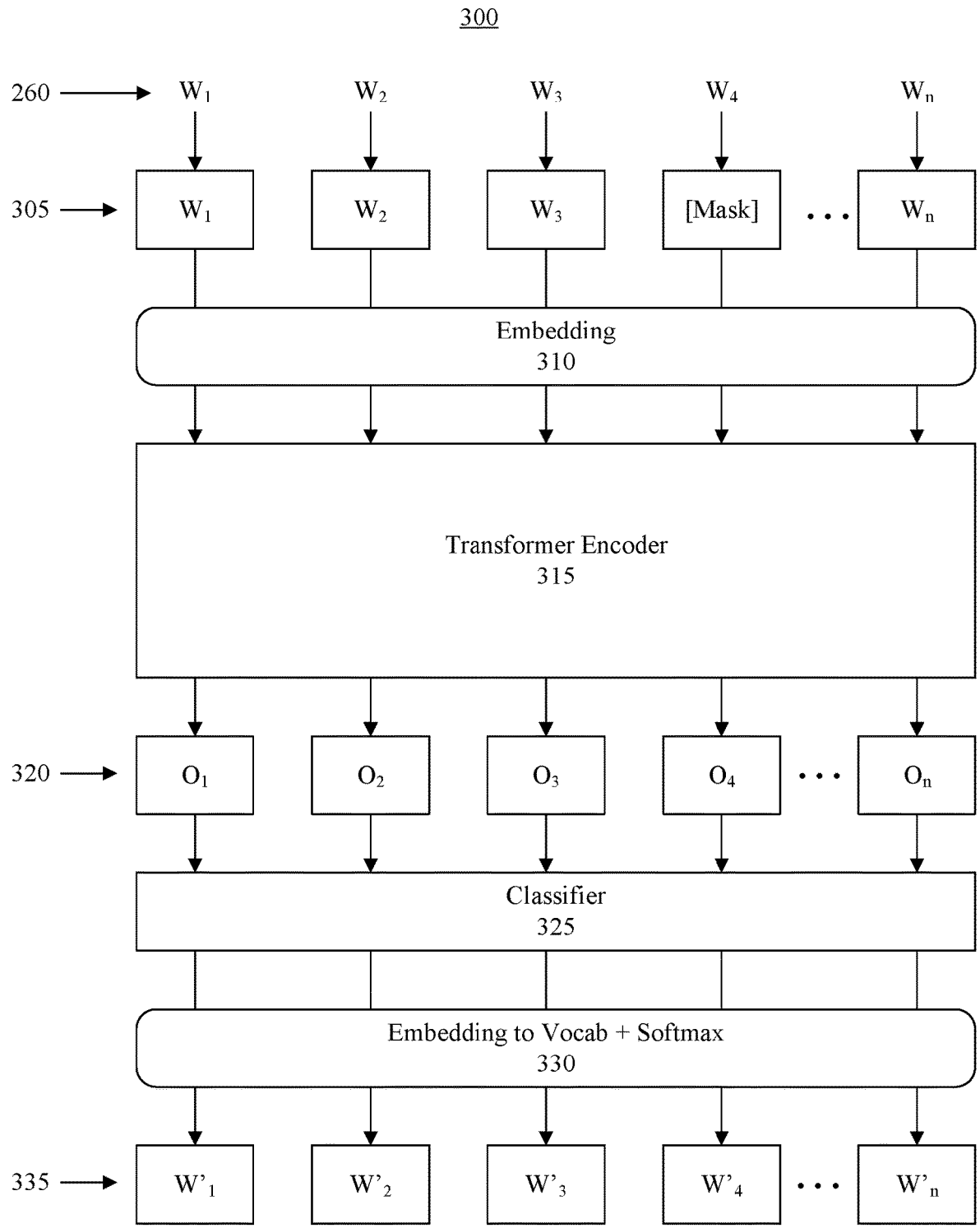
FIG. 3 depicts an example of natural language processing model used for creating a training dataset.

FIG. 3 is a flow diagram 300 depicting an example of training the NLP model 145. The NLP trainer 140 can initiate the BERT model to attempt to predict the original values of the masked tokens 160 based on the context of the other, non-masked tokens 160. In illustration, the NLP trainer 140 receive the tokens 260 for a sentence. During the training process, the NLP trainer 140 can selectively mask one or more of the tokens, resulting in a token set 305 for the sentence with at least one token 260, $W_4$ in this example, masked. In illustration, the token $W_4$ can be replaced with a "[MASK]" token. The NLP trainer 140 can include an embedding layer 310 that embeds the token set 305 into a token sequence with the at least one mask.

The NLP trainer 140 also can include a transformer encoder 315. The transformer encoder 315 can receive the token sequence having the at least one mask and receive vector representations for each token that is not masked. The transformer encoder 315 can use an attention-based algorithm to determine the context for each word represented by a token and generate output 320. The output 320 can include a fine-tuned vector representation for each token based on the context. Attention-based algorithms utilize different weight tests to understand what part of the data, in the case of BERT the words/tokens, are most important to represent the data with a higher level of abstraction, but keeping the properties of "attention items" in the data. The output 320 can be a vector/word embedding.

The classifier 325 can classify the output 320. For example, classifier 325 can learn to predict the word in the vocabulary with the highest probability of being the masked word. To do so, the classifier 325 can adjust weights and biases applied to the output 320. The weights and biases can indicate the contextual representation of the masked word. By way of example, if there are one hundred words in a vocabulary, the output of the classifier 330 can be a vector of one hundred dimensions, where each dimension represents the probability of each word being the masked word.

The NLP trainer 140 can include an embedding layer 330, which embeds the output of the classifier 325 into a vocabulary and Softmax function and outputs vector representations 335 of the tokens based on the classified output. The NLP trainer 140 can learn, by adjusting weights and biases applied to output of the classifier 325, to improve prediction of a masked word using Softmax activation. After the NLP model 145 is trained, new sentences can processed by it. The classifier 325 can output values for those sentences that are adjusted by the weights and biases in the embedding layer. Those values can be vectors that represent each word in the sentence. Accordingly, if the embedding layer 330 has one thousand and twenty four parameters/connectors with the classifier, the word embeddings are going to have one thousand and twenty four dimensions. This is the actual BERT vector for each word in the sentence.

Referring again to FIG. 2, with the NLP model 145 having been trained to generate vector representations for tokens 160, the data processing system 100 can initiate the NLP model 145 to perform NLP on tokens 160 for additional text-based messages 205 and generate vector representations 180 for the punctuation tokens 175. The NLP model 145 can store the punctuation token vector representations 180 in the punctuation dictionary 170.

The ANN generator/trainer 150 can generate the ANN 155. Further, the ANN generator/trainer 150 can access the punctuation tokens 175 and punctuation token vector representations 180 from the punctuation dictionary 170, as well as access the token sequences 165. The ANN generator/ trainer 150 can use the punctuation tokens 175, the punctuation token vector representations 180 and the token sequences 165 to train the ANN 155 to determine punctuation marks that should be added to, or that should be suggested for addition to, text being generated by users.

In illustration, the ANN 155 can be trained to determine, for each of a plurality of punctuation marks, a probability that the punctuation mark is an appropriate punctuation mark for text being entered into a client device by a user. Moreover, the ANN 155 can be trained to determine where in the text the punctuation mark should be added. For example, assume the user enters the text "Are you Jane Doe". The ANN 155 can generate output vectors for each of a plurality of possible punctuation marks. Based on the output vectors, the ANN 155 can determine that a punctuation mark should follow the word "Doe" and determine for each punctuation mark the probability that the punctuation mark is appropriate, as shown in Table 1.

TABLE 1

| Punctuation Mark | Probability |
| --- | --- |
| ! | 10% |
| ? | 74% |
| # | 3% |
| $ | 5% |
| ... | ... |
| ) | 8% |

In this example, the punctuation mark "?" has the highest probability of being the appropriate punctuation mark. Accordingly, the ANN 155 can select the punctuation mark "?" and suggest that punctuation mark to the user, or automatically add that punctuation mark to the end of the sentence entered by the user, following the word "Doe". The punctuation mark having the highest probability can be determined by determining the punctuation token vector representation 180 in the punctuation dictionary 170 that is closest to a vector determined by the ANN 155 processing the user input data 540 (e.g., using cosine distance), determining the punctuation token 175 corresponding to that punctuation token vector representation 180, and selecting the punctuation mark represented by the determined punctuation token 175.

Sometimes, in the colloquial, users may intend certain types of sentences to have a meaning different than their ordinary meaning. In this regard, users may often times generate a question with intent of the question being interpreted as a statement. For instance, if a user is communicating with a famous person, the user may end the sentence "Are you Jane Doe" with an exclamation mark ("!") rather than a question mark ("?"). The ANN 155 can be trained to identify the context of text being entered by a user and select the appropriate punctuation mark for colloquial use of that text. In illustration, the ANN 155 can generate output vectors in and, based on the output vectors, determine the probabilities for the punctuation marks as shown in Table 2.

TABLE 2

| Punctuation Mark | Probability |
| --- | --- |
| ! | 64% |
| ? | 20% |
| # | 3% |
| $ | 5% |
| ... | ... |
| ) | 8% |

In this example, the punctuation mark "!" has the highest probability of being the appropriate punctuation mark. Accordingly, the ANN 155 can select the punctuation mark "!" and suggest that punctuation mark to the user, or automatically add that punctuation mark to the end of the sentence entered by the user, following the word "Doe".

Figure 4:
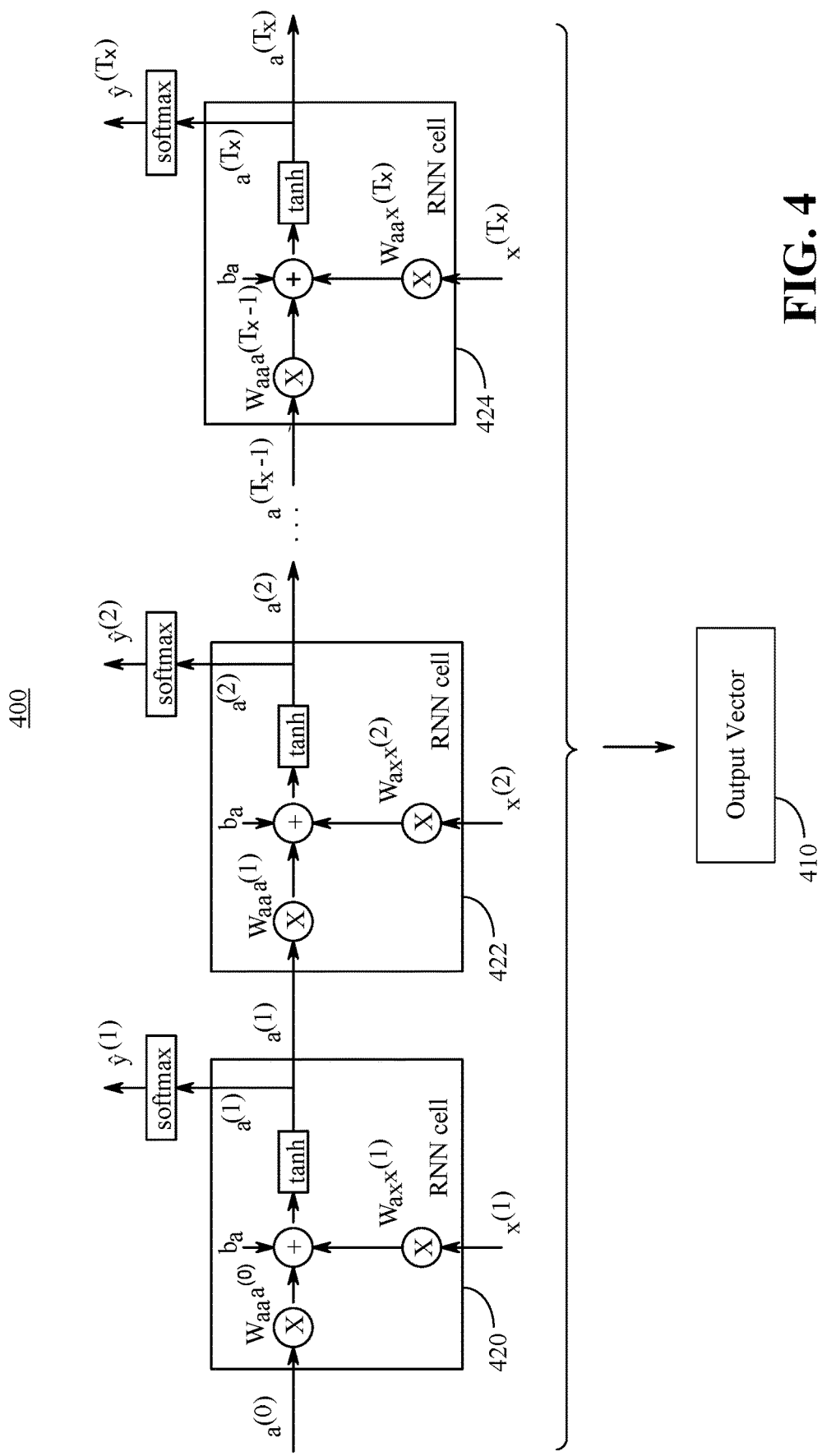
FIG. 4 depicts an example of an artificial neural network trained using a training dataset.

FIG. 4 depicts an example of the ANN 155 trained by the ANN generator/trainer 150 using the token sequences 165, punctuation tokens 175 and punctuation token vector representations 180 as a training dataset. The data processing system 100 can implement the ANN 155 to derive, for each punctuation token 175, an output vector 410 indicating the probability that a punctuation mark represented by a particular punctuation token 175 is the appropriate punctuation mark for the text being entered by a user. In this regard, FIG. 4 depicts a layer 400 of the ANN 155. Different punctuation token vector representations 180 can be modeled in their own respective layers, however. For example, a first layer of the ANN 155 can be used to model use of a first punctuation token 175, a second layer of the ANN 155 can be used to use of a second punctuation token 175, a third layer of the ANN 155 can be used to model use of a third punctuation token 175, a fourth layer of the ANN 155 can be used to model use of a fourth punctuation token 175, and so on. The ANN 155 also can include layers used to model use of words. The input and output layers of the ANN 155 can be the same size of the punctuation token vector representations 180.

In an arrangement in which the NLP model 145 is a BERT model, for example, the input layer can be the layer that receives the tokenized version of the text (e.g., words or punctuation marks) to be transformed and the output layer can provide the vector representation for each token in the input layer. The size of the vector representations can be directly linked with the level of granularity achievable by the semantics. Use of a higher the number of dimensions in the vector representation provides more granular/fine tuning of the embedded representations with enough training. In an auto-completion neural network, for example, the input layer can be the sequence of tokens in an unfinished sentence and the output can be the vector representation of the next word/token, which causes the model to learn to predict the most likely vector representation for the next word in an unfinished sentence. This can be used to compare to the Punctuation Dictionary 170 to find the most probable punctuation vector (based on the distance between the output vector and the punctuation dictionary items) and determine a suggestion for a punctuation mark to use and where to place the punctuation mark.

In illustration, each layer of the ANN 155 can include a plurality of artificial neurons, for example recurrent neural network (RNN) cells 420, 422, 424. The RNN cell 420 can receive an argument $a^{(o)}$, for example a variable of training data, and a parameter $x^{(1)}$ indicating a size of the data. The RNN cell 420 can apply a weight $W_{aa}$ to the argument $a^{(o)}$ and apply a weight $W_{ax}$ to the parameter $x^{(1)}$. Further, the RNN cell 420 can apply a bias $b_a$ to a sum of the weighted argument $W_{aa}a^{(o)}$ and the weighted parameter $W_{ax}x^{(1)}$. Further, the RNN cell 420 can apply a hyperbolic tangent function or a sigmoid function to the biased signal and output the result as $a_{(1)}$ and communicate the result to the RNN cell 422, forming a connection between the RNN cell 420 and the RNN cell 422. In this regard, the bias $b_a$ can provide a variable connection weight between the RNN cell 420 and the RNN cell 422. The RNN cell 420 also can output the biased result to a Softmax function which can output a result $\hat{y}^{(1)}$. The Softmax function can be a logistic function that compresses a K-dimensional vector z of arbitrary real values to a K-dimensional vector σ(z) of real values, for K≥2, where each entry is in the interval (0, 1), and all the entries sum to 1. The Softmax function can be used as a layer of the ANN 155 to determine relative frequency of values. The hyperbolic tangent function or sigmoid function can provide high fidelity to the results in comparison to other types of functions. The process can continue until a desired number of RNN cells 420-424 are connected, and the bias's $b_a$ can be adjusted to assign variable connection weights to the connections in order to adjust the connections as learning is applied to the ANN 155. Notably, the ANN 155 can be trained over time by modifying the weights and biases applied to the cells to fit input data with expected output data. Accordingly, the output vectors 410, and thus probability values, derived using the ANN 155 will improve over time.

In illustration, using the input text tokens (e.g., an unfinished sentence) the trained auto-completion neural network can output a vector representation for the next word. If that vector representation is not similar enough to any punctuation in the punctuation dictionary 170 (for example, using a threshold for a minimum similarity score), no punctuation is suggested. As the inputs keep changing (e.g., as a user enters additional text), the vector similarity can go above the minimum similarity score. In response, the ANN 155 select the most similar/probable punctuation, and trigger that punctuation to be suggested to the user.

Figure 5:
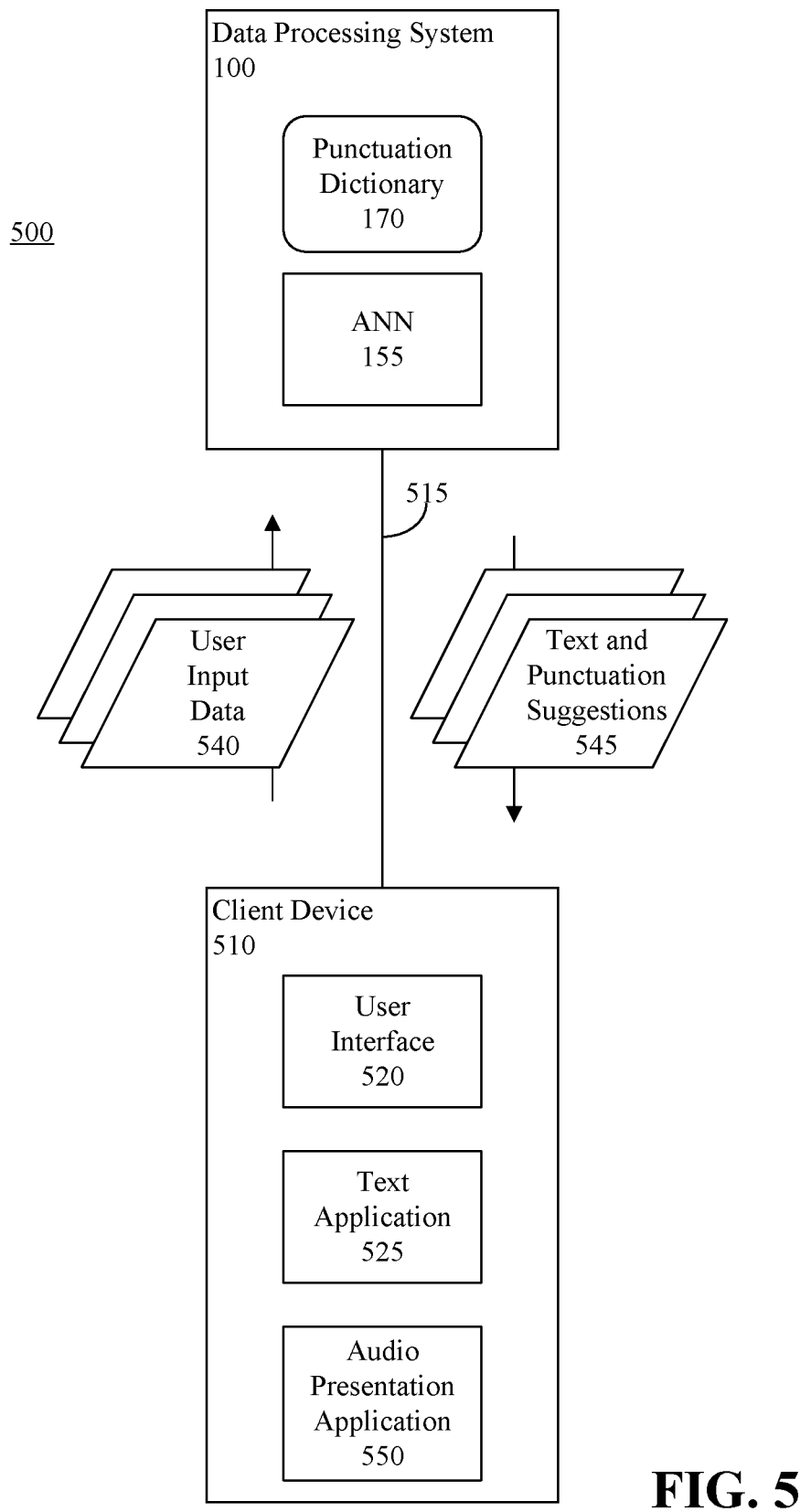
FIG. 5 is a block diagram illustrating an example of a system in which autocomplete using punctuation marks is implemented.

FIG. 5 is a block diagram illustrating an example of a system 500 in which autocomplete using punctuation marks is implemented. The system 500 can include the data processing system 100 of FIG. 1, for example as a server. In other arrangements, the system 500 can include a different data processing system configured to host the ANN 155, in which case a copy of the ANN 155 and the punctuation dictionary 170 can be stored in memory elements of the other data processing system. The ANN 155 can be executed by a processor of the other data processing system. In such arrangements, the data processing system 100 can be communicatively linked to the other data processing system via a communication network and the ANN Generator/Trainer 150 can continue to train the ANN 155 via the communications over the communication network. For brevity, in the description of FIG. 5 reference will be made to the data processing system 100, but it will be understood that the operations described as being performed by the data processing system 100 in FIG. 5 can be performed by another data processing system.

The system 500 also can include at least one client device 510 communicatively linked to the data processing system 100 via a communication network 515. The communication network 515 is the medium used to provide communications links between various devices and data processing systems connected together within the system 500. The communication network 515 may include connections, such as wire, wireless communication links, or fiber optic cables. The communication network 515 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The client device 510 can include a user interface 520. The user interface 520 can comprise, for example, a touch screen display, a conventional display, a keyboard, a mouse, a touchpad, a keypad, a microphone, etc. The client device 510 also can include a text application, for example a text messaging client, an e-mail client, a word processor, etc. Via the user interface 520 a user can enter text into the text application 525. For example, if the client device 510 is a smart phone, the user can enter text into the text application 525 using a virtual keyboard presented on a touch screen display or by speaking utterances detected by a microphone. If the client device 510 is a desktop computer, for example, the user can enter text into the text application 525 using a keyboard, by selecting text from a virtual keyboard using a mouse, or by speaking utterances detected by a microphone. Still, the user may enter text into the text application 525 in any other suitable manner and the present arrangements are not limited in this regard.

Responsive to the user entering into the user interface 520 inputs selecting text characters (e.g., for a text-based message being generated), in real time the client device 510 can communicate to the data processing system 100 user input data 540 indicating the text characters selected by the user. Responsive to receiving the user input data 540, the ANN 155 can, in real time, process the user input data 540 to predict the rest of a word the user is typing, predict whether a punctuation mark should be added to a sentence the user is typing, predict the punctuation mark that should be added, and predict where the punctuation mark should be added to the sentence the user is typing. The ANN 155 can, in real time, suggest the completion of the rest of the word using the prediction and, if the ANN 155 predicts a punctuation mark should follow that word, suggest the punctuation mark. As noted, the ANN 155 can access the punctuation dictionary 170 and use the punctuation tokens 175 (shown in FIG. 2) that represent punctuation marks and the vector representations 180 (shown in FIG. 2) for the tokens that represent punctuation marks to predict the use of punctuation marks in the sentence structures.

The ANN 155 can communicate the text and punctuation suggestions 545 to the text application 525. The text application 525 can present to the user suggestions to use predicted text/punctuation mark(s), or the text application 525 can automatically insert the text/punctuation mark(s) into a sentence the user is typing where appropriate.

In illustration, assume that the user has entered the following characters: "Are you John Sm". The ANN 155 can predict that the word beginning with "Sm" is "Smith" and, based on the context of "Are you John," the ANN 155 can predict the sentence should end with a question mark ("?"). Accordingly, the text and punctuation suggestions 545 can include the text/punctuation mark "Smith?". In another example, assume that the user has entered the following characters: "Are you Jane Do". The ANN 155 can predict that the word beginning with "Do" is "Doe" and, based on contexts in which the word sequence "Jane Doe" previously has been used in other text messages, which would be reflected in the training of the ANN 155, the ANN 155 can predict the sentence should end with an exclamation mark ("!"). Accordingly, the text and punctuation suggestions 545 can include the text/punctuation mark "Doe!".

Further, the user may implement the text and punctuation suggestions 545 in the text the user is generating, or the user may not. The text application 525 can communicate to the data processing system 100 (e.g., to the ANN Generator/Trainer 150) data indicating, for each text and/or punctuation mark suggestion, whether the user implemented the text and/or punctuation mark suggestion in the text the user is generating. The ANN Generator/Trainer 150 can use such data for further training of the ANN 155, for example to dynamically adjust the ANN 155 variables for determining the probability scores for the punctuation marks and for determining where the punctuation marks should be added to text. Accordingly, the performance of the ANN 155 at providing punctuation suggestions 545 will improve over time. Moreover, the suggestion of punctuation marks described herein serves to improve the quality of text autocomplete implemented by the system 500, thus improving performance of the system 500 at generating autocomplete suggestions.

In an arrangement, the text and punctuation suggestions 545 can be used to add emphasis in audio generated using text-to-speech processing. In illustration, the client device 510 can include an audio presentation application 550 (or an audio/video presentation application) that receives text input and implements text-to-speech processing on the text input to generate audio output. The audio presentation application can communicate the text input to the ANN 155 and receive from the ANN 155, in real time, punctuation mark suggestions for the text, for example to add punctuation marks that are not already present in the text. Again, the suggested punctuation marks can be based on the context of the sentences. In response to receiving the punctuation mark suggestions, the audio presentation application can add, in real time, the punctuation marks to the text, and the text-to-speech processing can be performed on the version of the text to which the suggested punctuation marks have been added. Accordingly, the text-to-speech processing can implement synthetic voice inflections corresponding to the punctuation marks, which serves to improve the quality, and thus performance, of the audio generated by the text-to-speech processing, thus improving performance of the system 500 at generating audio using text-to-speech processing.

Figure 6:
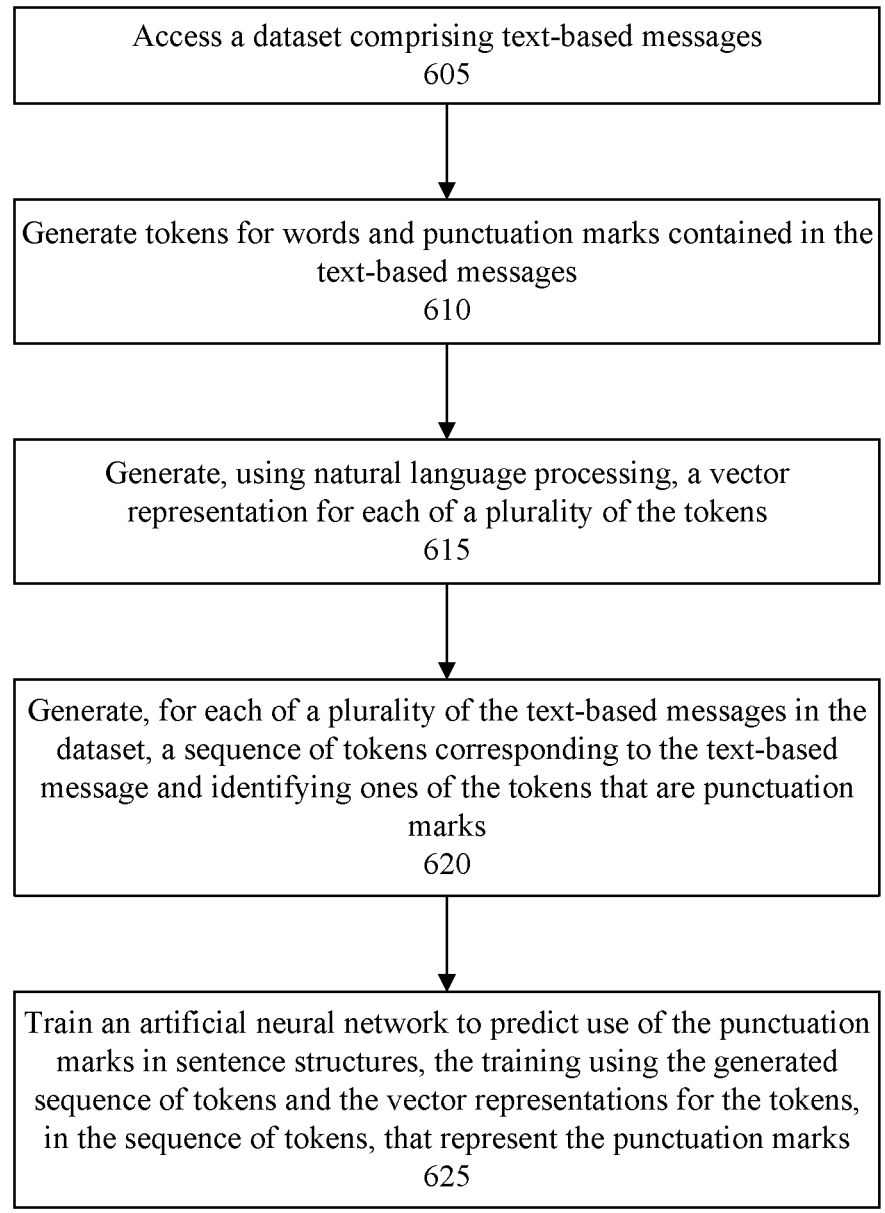
FIG. 6 is a flowchart illustrating an example of a method of autocompleting text using punctuation marks.

FIG. 6 is a flowchart illustrating an example of a method 600 of autocompleting text using punctuation marks. The method can be implemented by the data processing system 100 of FIG. 1. At step 605 the data processing system 100 can access a dataset comprising text-based messages. At step 610 the data processing system 100 can generate tokens for words and punctuation marks contained in the text-based messages, each token corresponding to one word or one punctuation mark. At step 615 the data processing system 100 can generate, using natural language processing, a vector representation for each of a plurality of the tokens. At step 620 the data processing system 100 can generate, for each of a plurality of the text-based messages in the dataset, a sequence of tokens corresponding to the text-based message and identifying ones of the tokens that are punctuation marks. At step 625 the data processing system 100 can train an artificial neural network to predict use of the punctuation marks in sentence structures, the training using the generated sequence of tokens and the vector representations for the tokens, in the sequence of tokens, that represent the punctuation marks.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
accessing a dataset comprising text-based messages;
generating tokens for words and punctuation marks contained in the text-based messages, each token corresponding to one word or one punctuation mark;
generating, using a processor implementing natural language processing, a vector representation for each of a plurality of the tokens;
generating, for each of a plurality of the text-based messages in the dataset, a sequence of tokens corresponding to the text-based message and identifying ones of the tokens that represent punctuation marks;
training an artificial neural network to predict use of the punctuation marks in sentence structures, the training using the generated sequence of tokens and the vector representations for the tokens, in the sequence of tokens, that represent the punctuation marks;
receiving text generated by a user using a client device;
predicting, in real time using the artificial neural network, a punctuation mark for use in the text generated by the user; and
outputting a suggestion to use the punctuation mark in the text, wherein the suggestion to use the punctuation mark is presented to the user by the client device.

2. The method of claim 1, wherein the text generated by the user is text of a text-based message being generated by the user.

3. The method of claim 1, wherein the implementing the natural language processing comprises implementing a Bidirectional Encoder Representation from Transformers language model.

4. The method of claim 1, wherein the artificial neural network is Long Short-Term Memory/Recurrent Neural Network.

5. The method of claim 1, further comprising:
storing in a punctuation dictionary the tokens that represent punctuation marks and the vector representations for the tokens that represent punctuation marks.

6. The method of claim 5, wherein the artificial neural network accesses the punctuation dictionary and uses the tokens that represent punctuation marks and the vector representations for the tokens that represent punctuation marks to predict the use of punctuation marks in the sentence structures.

7. A system, comprising:
a processor programmed to initiate executable operations comprising:
accessing a dataset comprising text-based messages;
generating tokens for words and punctuation marks contained in the text-based messages, each token corresponding to one word or one punctuation mark;
generating, using natural language processing, a vector representation for each of a plurality of the tokens;
generating, for each of a plurality of the text-based messages in the dataset, a sequence of tokens corresponding to the text-based message and identifying ones of the tokens that represent punctuation marks;
training an artificial neural network to predict use of the punctuation marks in sentence structures, the training using the generated sequence of tokens and the vector representations for the tokens, in the sequence of tokens, that represent the punctuation marks;
receiving text generated by a user using a client device;
predicting, in real time using the artificial neural network, a punctuation mark for use in the text generated by the user; and
outputting a suggestion to use the punctuation mark in the text, wherein the suggestion to use the punctuation mark is presented to the user by the client device.

8. The system of claim 7, wherein the text generated by the user is text of a text-based message being generated by the user.

9. The system of claim 7, wherein the implementing the natural language processing comprises implementing a Bidirectional Encoder Representation from Transformers language model.

10. The system of claim 7, wherein the artificial neural network is Long Short-Term Memory/Recurrent Neural Network.

11. The system of claim 7, the executable operations further comprising:
storing in a punctuation dictionary the tokens that represent punctuation marks and the vector representations for the tokens that represent punctuation marks.

12. The system of claim 11, wherein the artificial neural network accesses the punctuation dictionary and uses the tokens that represent punctuation marks and the vector representations for the tokens that represent punctuation marks to predict the use of punctuation marks in the sentence structures.

13. A computer program product, comprising:
one or more computer readable storage mediums having program code stored thereon, the program code stored on the one or more computer readable storage mediums collectively executable by a data processing system to initiate operations including:
accessing a dataset comprising text-based messages;
generating tokens for words and punctuation marks contained in the text-based messages, each token corresponding to one word or one punctuation mark;
generating, using natural language processing, a vector representation for each of a plurality of the tokens;
generating, for each of a plurality of the text-based messages in the dataset, a sequence of tokens corresponding to the text-based message and identifying ones of the tokens that represent punctuation marks;
training an artificial neural network to predict use of the punctuation marks in sentence structures, the training using the generated sequence of tokens and the vector representations for the tokens, in the sequence of tokens, that represent the punctuation marks;
receiving text generated by a user using a client device;
predicting, in real time using the artificial neural network, a punctuation mark for use in the text generated by the user; and
outputting a suggestion to use the punctuation mark in the text, wherein the suggestion to use the punctuation mark is presented to the user by the client device.

14. The computer program product of claim 5, wherein the text generated by the user is text of a text-based message being generated by the user.

15. The computer program product of claim 13, wherein the implementing the natural language processing comprises implementing a Bidirectional Encoder Representation from Transformers language model.

16. The computer program product of claim 13, wherein the artificial neural network is Long Short-Term Memory/Recurrent Neural Network.

17. The computer program product of claim 13, wherein the program code is executable by the data processing system to initiate operations further comprising:

storing in a punctuation dictionary the tokens that represent punctuation marks and the vector representations for the tokens that represent punctuation marks.

18. The computer program product of claim 13, wherein the artificial neural network accesses the punctuation dictionary and uses the tokens that represent punctuation marks and the vector representations for the tokens that represent punctuation marks to predict the use of punctuation marks in the sentence structures.

\* \* \* \* \*